United States Patent [19]
Wells

[11] Patent Number: 4,799,834
[45] Date of Patent: Jan. 24, 1989

[54] CUTTER INSERT FOR KEVLAR

[75] Inventor: Wesley G. Wells, Hazelwood, Mo.

[73] Assignee: McDonnell Douglas, Long Beach, Calif.

[21] Appl. No.: 794,646

[22] Filed: Nov. 4, 1985

[51] Int. Cl.⁴ .............................................. B23B 51/10
[52] U.S. Cl. ................................. 408/200; 408/225; 408/713; 407/42
[58] Field of Search .............. 408/713, 189, 223, 200, 408/224, 225, 227; 407/40, 42, 48, 57, 61

[56] References Cited

U.S. PATENT DOCUMENTS

| | | | |
|---|---|---|---|
| 4,072,438 | 2/1978 | Powers | 407/42 |
| 4,197,042 | 4/1980 | Krhounek | 408/713 |
| 4,285,620 | 8/1981 | Luebbert et al. | 408/212 |
| 4,353,670 | 10/1982 | Jorgensen | 408/713 |
| 4,505,626 | 3/1985 | Benhase | 408/713 |

OTHER PUBLICATIONS

"New Developments in Drilling Composites Containing Kevlar ® Aramid Fiber," *Cutting Tool Engineering*, Oct., 1984, pp. 22–26.

Tool and Manufacturing Engineers Handbook, vol. 1, Machining, 1983, pp. 9-14 to 9-15, and 9-108 to 9-110.

*Primary Examiner*—Gil Weidenfeld
*Assistant Examiner*—Daniel W. Howell
*Attorney, Agent, or Firm*—George W. Finch; John P. Scholl; G. A. Cone

[57] ABSTRACT

A cutting tool especially for use on KEVLAR comprises a rotatable holder and an insert which is attached on the holder. The insert has a particular shape useful for shearing the KEVLAR fibers and forming a countersink.

5 Claims, 2 Drawing Sheets

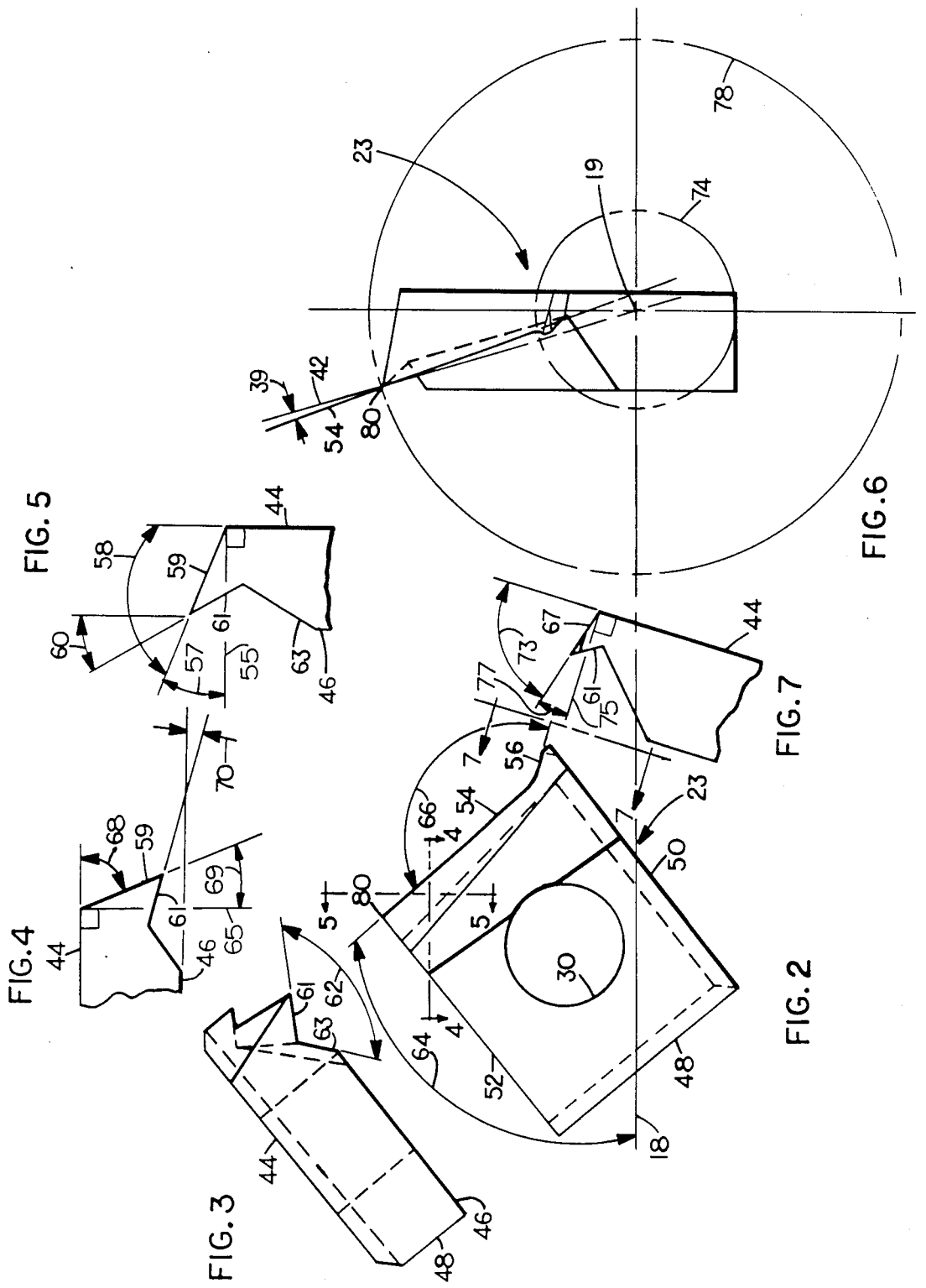

CUTTER INSERT FOR KEVLAR

BACKGROUND OF THE INVENTION

Composite parts used in the aerospace industry may be comprised of fibers embedded in a matrix material, as for example, epoxy resins. To increase the strength of the component parts new fibers have been developed and used as the reinforcements, such as graphite, boron and KEVLAR. Due to the extreme toughness of the KEVLAR fibers, new methods must be developed to cut these fibers to shape the component parts and to drill and countersink holes in the KEVLAR work pieces to provide holes and attachment points for bolts, screws and rivets. cutter insert which is held in a rotary tool by a cam lock pin. The insert is held precisely in the holder by three alignment surfaces. When the cutting edges of the insert become dull, the insert may be removed and either sharpened or replaced.

The insert of U.S. Pat. No. 4,197,042 was designed for cutting a composite with a graphite fiber matrix. This cutting insert was ineffective in countersinking a hole in or a hybrid composite composed of KEVLAR epoxy and Carbon epoxy. One method that has been tried for cutting holes in composites which utilize KEVLAR fibers or in a hybrid composite, is to use a piece of sacrificial material clamped to the KEVLAR surface to enhance the cutting effect of the insert. Even this method has not been entirely successful.

The object of this invention is to provide a replaceable carbide cutter insert that will cut a countersunk hole in KEVLAR epoxy without the need for sacrificial material and will provide a clean surface without broken or exposed fibers. The inventive insert accomplishes the desired result by providing a straight cutting surface that engages the composite in a shearing action as the tool holder rotates the insert into the workpiece. The cutter insert may be constructed by brazing or fusing a thin layer of polycrystaline diamonds to the carbide body at the cutting edges. The insert may be provided with two cutting surfaces, to define a hole with a double-tapered conical surface.

BRIEF DESCRIPTION OF THE DRAWINGS

FIG. 2 is a plan view of the inventive insert;

FIG. 3 is a side view of the insert shown in FIG. 2;

FIG. 4 is a partial section view of the cutter insert of FIG. 2 along the line 4—4 (parallel to axes of rotation of the cutter) showing the detail forming the main or chamfer cutting edge;

FIG. 5 is a partial section view of the cutter insert of FIG. 2 along the radial line 5—5 showing detail on chamfer cutting edge;

FIG. 6 is a vertical side projection view of the insert of FIG. 2; and

FIG. 7 is a partial side elevation view of the secondary cutting edge along the line 7—7 of FIG. 2.

DETAILED DESCRIPTION OF THE INVENTION

Figure 1:
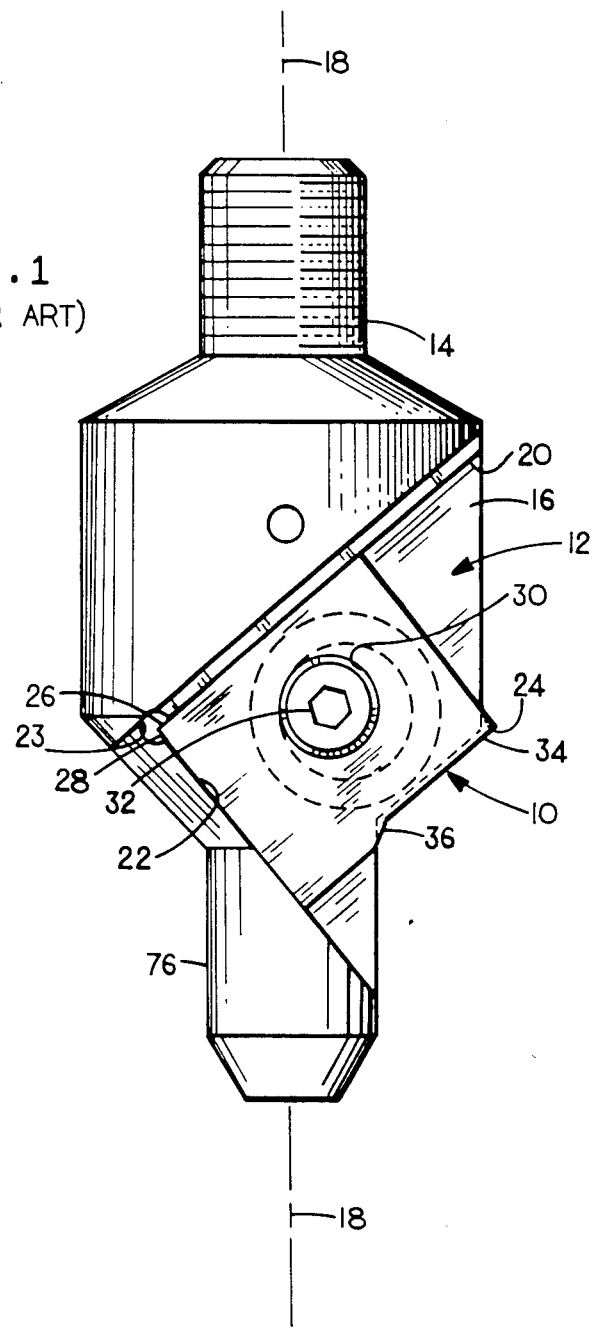
FIG. 1 is a front side view of a prior art holder with a cutter insert in place.

In the prior art holder of FIG. 1, a cutter insert 10 is positioned in the pocket 12 of the holder 14. The pocket 12 is defined by three reference surfaces; a planar reference surface 16 oriented parallel to the axis of rotation 18, a first reference surface 20 adjoining and perpendicular to the planar reference surface 16 and a second reference surface 22 adjoining and perpendicular to the planar surface 16 and perpendicular to the first reference surface 20. Three corresponding positioning surfaces on the insert 10 engage the reference surfaces on the holder 14 and precisely locate the insert in the pocket 12 of the holder 14. They are a planar surface 24, a first peripheral surface 26 and a second peripheral surface 28. The holder has a cylindrical hole 23 perpendicular to planer reference surface 16 at the intersection of first reference surface 20 and second reference surface 22. This cylindrical hole 23 assures clearance for the corner of insert 10 formed by the intersection of first peripheral surface 26 and second peripheral surface 28 and proper seating of the insert 10 in pocket 12. The cutter insert 10 has a cylindrical hole 30, perpendicular to planer surface 24, to receive a cam lock pin 32. When the insert 10 is placed over the cam lock pin 32, and the three positioning surfaces engage the corresponding surfaces on the holder, the cam lock pin 32 is rotated and the cutter insert 10 is locked into precise engagement with the holder 14.

Two simple cutting surfaces are found on the prior cutting insert 10. The first or main cutting edge 34 is formed by the intersection of a beveled plane and the outside surface of the insert. A second cutting edge 36 is formed by the intersection of a second beveled plane and the outside surface of the insert. These two cutting edges define two frustoconical surfaces when the cutter insert 10 is held in the holder 14 and the holder 14 is rotated around its axis of rotation 18. When the cutter 10 is rotated and forced into a workpiece, two frustrocones result. The purpose of having the two frustroconical surfaces in the countersunk hole in the workpiece is so that the head to shank attachment of rivets, screws or bolts does not engage a edge on the workpiece and create a stress area with potential breakdown of the workpiece material, with the two concentric frustrocone surfaces cut in the workpiece, the head of the attachment member seats properly on the main frustrocone in the workpiece and no binding results between the workpiece and the attachment member at the intersection of the conical head and the shaft of the attachment member.

The prior art cutter of U.S. Pat. No. 4,197,042 is relatively uncomplicated and designed to cut some of the older composites. In this cutter the radial location of the main cutting edge was either at zero, i.e., a radius intersecting the center of rotation or at a minus angle, i.e., leading the radius at the center of rotation resulting in a scraping action to remove the fibers and epoxy resin.

The new cutting insert 23, (FIGS. 2 thru 7) may be constructed from one of the numerous carbides. Its straight cutting surfaces are designed to shear the KEVLAR fibers with the main cutting edge 54 located at angle 39 which has a radial location of 4° positive to center of rotation, i.e., a line drawn along the main cutting edge 54 will, as compared to a radius 42, pass behind the center of rotation 19 (FIG. 6.).

Considering FIG. 2, a plan view of the inventive cutter insert and FIG. 3, an end view of the insert rotated 90° from FIG. 2, the insert is shown having an inside surface 44 designed to be parallel to the axis of rotation 18 of the holder 14 and a parallel outside surface 46. Perpendicular to the inside positioning surface 44 is a first peripheral positioning edge 48 and perpendicular to the first peripheral edge 48 is a second peripheral positioning edge 50 which is also perpendicular to the inside positioning surface 44. These two peripheral positioning edges engage corresponding reference surfaces on the insert holder 14 in a manner similar to the engagement of the prior art insert 10. Inside surface 44 engages planar reference surface 16, first peripheral positioning edge 48 engages first reference surface 20 and second peripheral positioning edge 50 engages second reference surface 22. A third peripheral surface 52 is parallel to the second peripheral surface 50 and perpendicular to the first peripheral surface 48 and perpendicular to the inside surface 44.

The edge formed by the intersection of the inside surface 44 and the first peripheral edge 48 (FIG. 3) has been chamfered so that the cutter insert will bottom properly in the pocket 12 of the holder 14. Similarly the edge formed by the intersection of the second peripheral edge 50 and the inside surface 44 (FIG. 2 dotted line) has been chamfered to insure an accurate fit of the cutter insert 23 in the holder 14.

The main or chamfer cutting edge 54 adjoins the third peripheral edge. A secondary or radius cutting edge 56 adjoins the chamfer cutting edge 54. In FIGS. 4, 5 & 7 the precise angles of the surfaces which form these cutting edges are shown. Angle 58 (FIG. 5) is the angle at which the plane forming the primary radial relief surface 59 intersects the inside surface 44 and is 67° plus or minus 2°. The radial relief angle 57 is 23 degrees or minus 2 degrees and is measured between face 59 and plane 55 which is perpendicular to inside surface 44. Angle 60 is eleven degrees plus or minus 2° and is formed between the outside surface 46 and primary radial rake face 61. Angle 62 (FIG. 3) is 95° plus 10° minus 0° and is located between the flute face 63 and the radial rake face 61.

In FIG. 4 the angle 68 of 71° plus or minus 2° is measured between the primary relief face 59 and the inside surface 44. The axial relief angle 69 is 19 degrees plus or minus 2 degrees and is measured between the primary relief face 59 and the plane 65 which is perpendicular to inside surface 44. The axial rake angle 70 is five degrees plus or minus 2° measured between outside surface 46 and axial rake face 61.

The intersection of the relief face 59 and the rake face 61 forms the main or chamfer cutting edge 54. The chamfer cutting edge 54 is set on the cutter insert at an angle to suit the angle on the fastener head. In the present application, the chamfer cutting edge forms cone angle 64 (FIG. 2) when the cutting insert 23 is mounted in the holder 14 and the holder is rotated around its axis of rotation 18. This angle of 50° is measured between axis of rotation 18 and the chamfer cutting edge 54 or between axis of rotation and the surface of the cone generated by chamfer cutting edge. This 50° cone angle is designed to abut a 50° conical surface on the fastener head. If the angle on the fastener head was 40° the chamfer cutting edge could be set on the chip to accommodate this new fastener head configuration.

In FIG. 2, the angle 66 locates the secondary or radius cutting edge 56 which is 145° plus or minus 3° to the chamfer cutting edge 54. The radius cutting edge 56 (FIG. 2) formed by the intersection of the radius relief face 67 and the radius rake face 61 (FIG. 7.) FIG. 7 is a side elevation view taken along the line 7—7 of FIG. 2 and line 7—7 is perpendicular to cutting edge 56 as shown in FIG. 2. The radius relief face 67 is a plane cut at angle 73. Angle 73 is measured in between the inside surface 44 and the radius relief face 67 and is 71° plus or minus 3°. The radius relief angle 77 is 19 degrees plus or minus 3 degrees and is measured between the radius relief face 67 and a plane 75 which is perpendicular to the inside surface 44. The radius rake face is an extension of the primary rake face 61.

In FIG. 6, the inventive cutter insert 23 is shown in a vertical position as it would be mounted in a holder 14. The small circumferential outline 74 represents the pilot portion 76 (FIG. 1) of the holder 14. The larger outline circle 78 represents the point 80 generated by the intersection of the chamfer cutting edge 54 and the third peripheral edge 52. The cutting angle 39 of the chamfer cutting edge 54 (FIG. 6) is 4° positive to centerline, and is measured as the difference between a radius line 42 from the center of rotation of the holder 19 and the chamfer cutting edge 54. The chamfer cutting edge, if extended, would pass 4° behind the center of rotation 19. By creating a straight cutting edge which is 4° positive to the centerline, the KEVLAR fibers of the composite workpiece are sheared beginning at the outside of the frustroconical surface toward the center of the rotation 19.

There has been shown and described a novel cutting insert for cutting KEVLAR fibers of a KEVLAR epoxy workpiece. Many changes, modifications, variations and other uses and applications of the subject invention will, however, become apparent to those skilled in the art after considering this Specification and the accompanying drawings. All such changes, modifications, alterations and other uses and applications which do not depart from the spirit and scope of the invention are deemed to be covered by the invention which is limited only by the claims which follows:

What is claimed is:

1. A cutting insert, for use on a rotating holder as a countersinking tool to cut a work piece, said holder having an axis of rotation and a pocket to receive the insert, said pocket having a planar reference surface parallel to the axis of rotation, a first reference surface adjoining and perpendicular to said planar reference surface, and a second reference surface adjoining and perpendicular to said planar reference surface and adjoining and perpendicular to said first reference surface, said cutting insert comprising:

an inside surface for engaging said planar reference surface and seating said insert in the pocket of said holder;

a first peripheral edge, adjoining and perpendicular to said inside surface, for engaging said first reference surface and seating said insert in said pocket of said holder;

a second peripheral edge, adjoining and perpendicular to said inside surface and perpendicular to said first peripheral edge, for engaging said second reference surface and seating said insert in said pocket of said holder;

a third peripheral edge adjoining and perpendicular to said inside surface and perpendicular to said first peripheral edge and parallel to said second peripheral edge;

an outside surface parallel to said inside surface and joining and perpendicular to said first peripheral edge, joining and perpendicular to said second peripheral edge and joining and perpendicular said third peripheral edge means for releaseably holding said insert in said pocket of said holder;

a relief face adjoining said third peripheral edge and located between said second and said third peripheral edges, said relief face comprising a flat surface intersecting said inside surface at axial relief angle of 19 degrees plus or minus two degrees and at a radial relief angle of 23° plus or minus 2°;

a primary rake face adjoining said third peripheral edge and located between said second and said third peripheral edges, said primary rake face comprising a flat surface intersecting said outside surface at an angle of 5 degrees plus or minus two degrees;

a chamfer cutting edge formed by the intersection of the relief face and the primary rake face, said chamfer cutting edge located 4 degrees positive to the centerline of the holder.

2. The cutting insert of claim 1 having:

a radius relief face adjoining said primary relief face and located between said second and said third peripheral edges said radius relief face comprising a flat surface intersecting a plane which is perpendicular to said inside surface at an angle of 19 degrees plus or minus three degrees;

a radius rake face located between said second and said third peripheral edges, and adjoining said primary rake face said radius rake face comprising an extension of the primary rake face;

a radius cutting edge formed by the intersection of the radius relief face and the radius rake face, and said radius cutting edge located 145 degrees plus or minus three to the chamfer cutting edge.

3. The cutter insert of claim 1 having a flute face adjoining said third peripheral edge and located between said second and said third peripheral edges, said flute face comprising a plane intersecting the radial rake face at an angle of 95° plus 10 minus 0 degrees.

4. The cutter insert of claim 1 having the chamfer cutting edge located at an angle such that when the insert is mounted in the holder and the holder is rotated around the axis of rotation of the holder it generates a 50° cone of revolution.

5. The cutter of claim 1 wherein the insert is made of carbide and the chamfer cutting edge comprise a thin layer of poly crystalline diamonds.

* * * * *